H. SALMOND.
CHANGE SPEED GEARING.
APPLICATION FILED SEPT. 15, 1908.

920,660.

Patented May 4, 1909.
2 SHEETS—SHEET 2.

Witnesses:
P. F. Nagle
H. S. Dieterich

Inventor
Henry Salmond
By Niedersheim & Fairbanks
Attorneys.

UNITED STATES PATENT OFFICE.

HENRY SALMOND, OF GLASGOW, SCOTLAND.

CHANGE-SPEED GEARING.

No. 920,660.  Specification of Letters Patent.  Patented May 4, 1909.

Application filed September 15, 1908. Serial No. 453,149.

*To all whom it may concern:*

Be it known that I, HENRY SALMOND, a subject of the King of Great Britain, residing at 25 Wellington street, Glasgow, Scotland, have invented a certain new and useful Improved Change-Speed Gearing, of which the following is a specification.

This invention relates to change speed gearing specially adapted for machine tools or motor vehicles but which can be used in other gearing where it is desirable to have a variety of speed changes available.

The invention consists in providing an improved change speed gearing characterized by a driving pulley carried on a sleeve on the driven spindle with two or more sets of speed changing gear wheels mounted on parallel spindles or on sleeves thereon and arranged on either side of said pulley. The speeds obtained from the set of change wheels at one side of the driving pulley are capable of being multiplied into each speed change obtainable by means of the gear wheels at the other side of the pulley, clutch means being provided whereby the various slidable gear wheels may be engaged with or disengaged from certain other gear wheels to give the desired speed changes.

In order that my invention may be clearly understood I have hereunto appended explanatory sheets of drawings whereon I have shown, by way of example, one form of change speed gear made in accordance with the invention.

Figure 1:
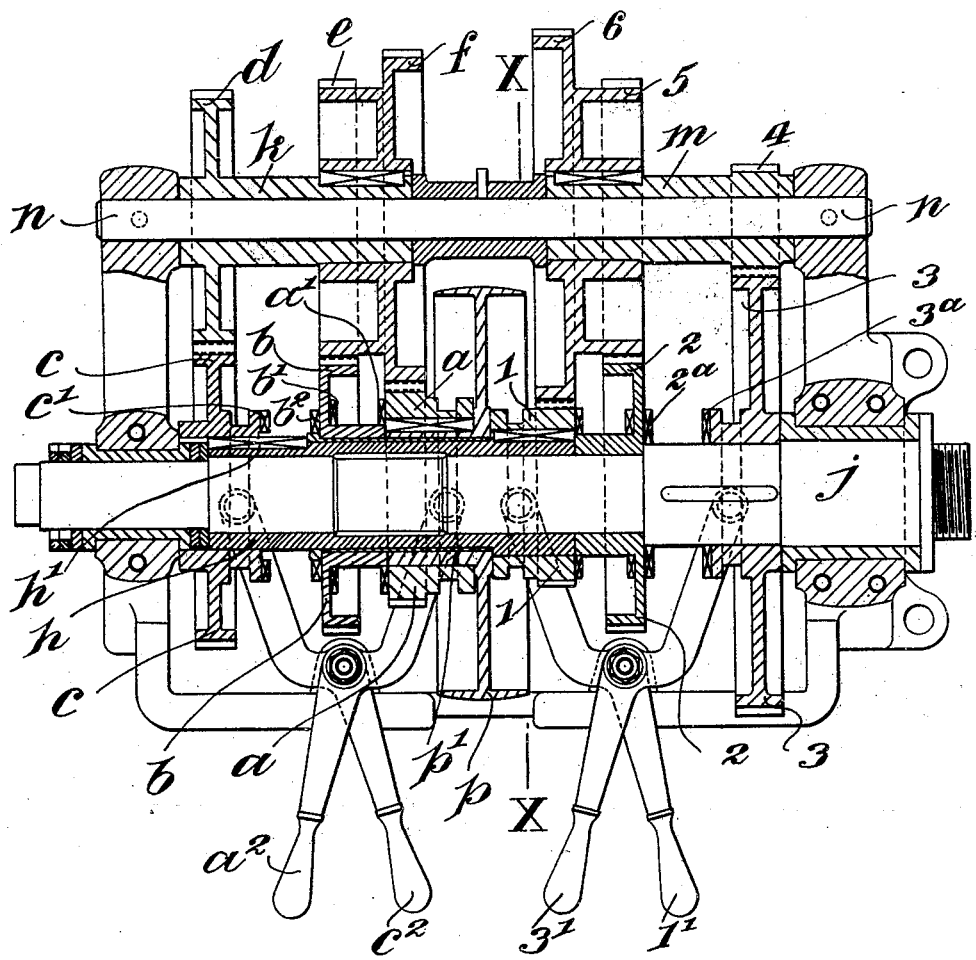
Figure 2:
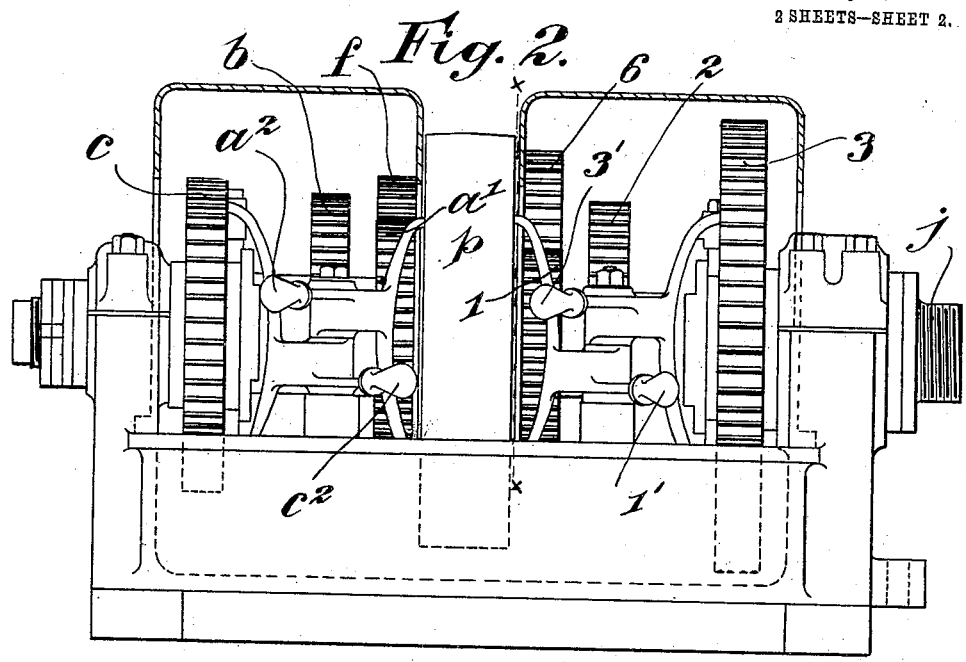
Figure 3:
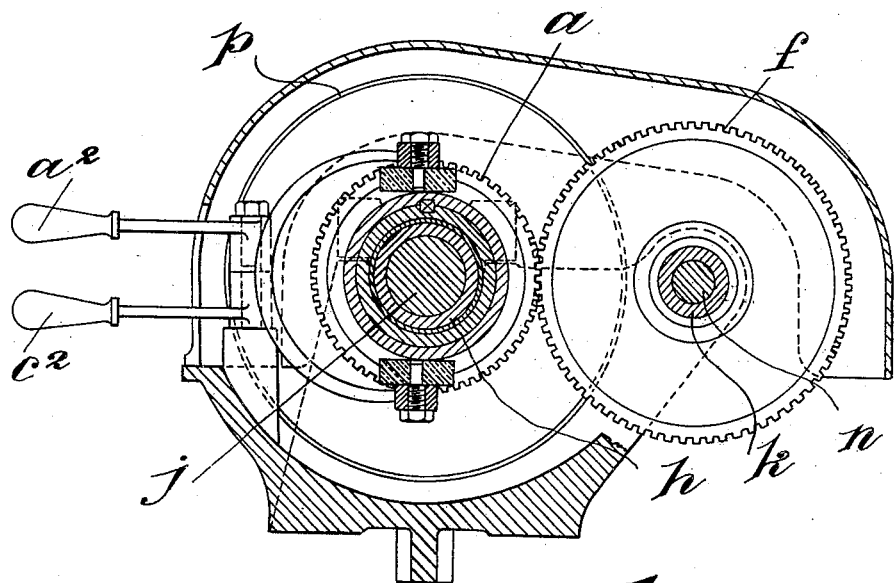

Figure 1 is a sectional plan of the gearing along the center line of the shaft. Fig. 2 is a side elevation of the gearing and Fig. 3 is a cross section on the line $x$, $x$, Figs. 1 and 2.

On the drawings the same reference characters wherever repeated indicate the same parts.

The gearing shown on the drawings is designed to give sixteen different speeds and shows a headstock suitable for machine tool work.

On the shaft $j$ which is to be driven I arrange a sleeve $h$ and on the sleeve $h$ I fit a loose pulley $p$ having a gear wheel $a$ slidably keyed on its boss. A secondary sleeve $k$ on a spindle $n$ is provided parallel to the shaft $j$ and gear wheels $f$, $e$, and $d$ are arranged on the sleeve $k$ from which through gear wheels $a$, $b$ and $c$ on the pulley boss $p^1$ and sleeve $h$ various speed changes of the shaft $j$ are obtained. A third sleeve $m$ also parallel to the shaft $j$ is provided and this sleeve also carries a number of gear wheels 6, 5 and 4 from which through the wheels 1, 2 and 3 on the sleeve $h$ and shaft $j$ a further series of speed changes of the shaft $j$ are obtained. The speed changes obtainable by means of the gears $f$, $e$, $d$ and $a$, $b$, $c$, at the one side of the pulley $p$ are capable of being each multiplied into the speed changes obtainable from the gears 6, 5, 4, and 1, 2, 3, at the other side of the pulley $p$. The slidable gear wheels $a$, $c$, 1 and 3 which are moved to give the desired changes of speed as will be hereinafter described are operated by means of levers $a^2$, $c^2$ $1^1$ and $3^1$.

The pulley $p$ is driven at a constant speed, the rotation of the pulley being obtained by belt or other power transmitting means from a countershaft or main shaft, or the pulley $p$ may be coupled direct to the prime mover. The pulley is carried on a loose sleeve $h$ on the spindle or shaft $j$ which latter is to be driven at the various speeds as will be hereinafter described.

Keyed to the long extended boss $p^1$ of the pulley $p$ and free to slide along the same is a toothed wheel $a$ which may be put into or out of gear with a toothed wheel $f$, fixed on a secondary sleeve $k$ revolubly carried on a secondary fixed spindle or shaft $n$ which is arranged parallel to the spindle or shaft $j$. The wheel $a$ is keyed to the boss $p^1$ of the pulley $p$, and it rotates at pulley speed, and, on its being put into gear with the wheel $f$ the latter and with it the secondary sleeve $k$ are rotated at a certain speed depending on the diameters of the wheels $a$ and $f$. The speed thus conveyed to the secondary sleeve $k$ is, by means of the toothed wheels $d$ and $c$, which are capable of being put into gear, transmitted to the sleeve $h$. At the end of sleeve $h$ a toothed wheel 1 is slidably fixed and the speed given to the sleeve $h$ is the speed of the wheel 1. The wheel 1 is capable of gearing with the wheel 6 on a secondary sleeve $m$ is also revolubly carried on the fixed spindle $n$ and at the end of this sleeve a toothed wheel 4 is formed or attached in any suitable manner, and this wheel 4 is capable of gearing with a wheel 3 slidably keyed to the spindle $j$ thereby, when the wheel 3 is in gear with the wheel 4, rotating the spindle $j$ at a speed corresponding to the speed of the sleeve $h$. A toothed wheel $b$ revolves freely on the sleeve $h$ and the wheel $a$ is capable of being put into engagement with this wheel by means of clutch teeth $b^1$ and $a^1$ on the sides thereof and when the wheel $a$ is in engagement with the wheel $b$ it is out of engagement with the wheel $f$ so that the speed of the wheel $a$ (which is pulley speed) is transmitted to the wheel $b$ and as the latter is in gear with a wheel $e$, keyed on the secondary sleeve $k$, the latter is driven at a corresponding speed and by means of the gear wheels $d$ and $c$ on the ends of the sleeves $k$ and $h$ respectively, the sleeve $h$ is driven at the speed obtained from sleeve $k$ through these wheels $d$ and $c$ and, consequently, by means of wheels 1, 6, 4 and 3 and, as already described, the spindle $j$ is also driven at this speed, so that we have thus obtained two speeds for the driven spindle or shaft $j$.

The toothed wheel $c$ is made with clutch teeth $c^1$ on one side thereof and it is capable of being moved along the keyway $h^1$ on the sleeve $h$ so that the clutch teeth $c^1$ may be engaged with corresponding clutch teeth $b^2$ on the wheel $b$.

By this means we obtain two other speeds of the spindle $j$, viz., the wheel $a$ (at pulley speed) driving the wheel $f$ on the second sleeve $k$ and the wheel $e$, which is made one with or suitably attached to the wheel $f$, driving the wheel $b$ on the sleeve $h$ and the latter wheel by its being in engagement with the wheel $c$, driving this wheel and consequently the sleeve $h$ to which it is keyed, thereby giving another speed to the said sleeve $h$ and through wheels 1, 6, 4 and 3 this speed is transmitted to the spindle $j$ thus making the third speed at which the spindle $j$ can be driven. If the wheel $a$ is moved out of gear with the wheel $f$ on the secondary sleeve $k$ and clutched with the wheel $b$, then this, with the wheel $c$ clutched to the wheel $b$, and through wheel $b$ to sleeve $h$ and thence by wheels 1, 6, 4 and 3 gives the fourth speed to the spindle or shaft $j$.

The gear wheel 1, at the end of the sleeve $h$ is keyed to that sleeve but free to slide thereon and it can be engaged either with the wheel 6, on the secondary sleeve $m$, thereby giving to the sleeve $m$ the four speeds just described, or, it may be moved out of engagement with the wheel 6, and, by means of the clutch teeth on the side thereof, it may be engaged with corresponding clutch teeth on the side of the wheel 2 which is loosely carried on the spindle $j$ so that this wheel 2, which gears with a wheel 5 keyed on the sleeve $m$ will convey another range of four speeds to the sleeve $m$ and consequently through wheels 4 and 3 to the spindle $j$ so that the spindle $j$ has now a range of eight speeds, four through the gears 1 and 6 and four through gear wheels 2 and 5. The gears 6, 5 and 4 and the sleeve $m$ revolve with the sleeve $m$ as one gear and the gear wheel 4, if the wheel 3 is in gear with it, will, through this wheel which is keyed to the spindle $j$, rotate the latter at a speed corresponding to the speed of the sleeve $m$.

The gear wheel 3 is slidably keyed on the spindle $j$ so that by means of a clutch device $3^a$ on the side thereof it is capable of being engaged with a corresponding clutch device $2^a$ on the side of the gear wheel 2 and by sliding the wheel 3 out of gear with the wheel 4 and into engagement with the wheel 2 we have, through the sleeve $m$ and wheels 5, 2 and 3 other eight ranges of speed of the spindle $j$.

The gear wheels may be moved into or out of engagement by means of lever arrangements such as shown in the drawings at $a^2$, $c^2$, $3^1$ and $1^1$ or other suitable means may be used to bring the different gears into motion.

By adding two gear wheels on the left hand side of the pulley we obtain 6 changes instead of 4 on this side and these 6 changes multiplied into the gear on the right hand side of pulley, as shown in the drawing, would give 24 changes of speed and, similarly, if two other gear wheels were added to the gears on the right hand side of pulley the changes obtainable would be increased up to 36 changes of speed, and, in this way, by adding gear wheels, the possible number of changes of speed may be increased indefinitely.

Having now fully described my invention what I claim and desire to secure by Letters Patent is:—

1. A change speed gearing comprising, in combination, a frame, a primary spindle revolubly fitted in said frame, a secondary spindle fixed in said frame parallel to the primary spindle, a sleeve freely fitted on said primary spindle, a pulley freely mounted on said sleeve, a sleeve on the secondary spindle, means for rotating said second sleeve from the driving pulley and means coöperating with the first-mentioned sleeve for transmitting the rotation of said second sleeve to the primary spindle.

2. A change speed gearing comprising, in combination, a frame, a primary spindle revolubly fitted in said frame, a secondary spindle fixed in said frame parallel to the primary spindle, a sleeve freely fitted on said primary spindle, a pulley freely mounted on said sleeve, two sleeves mounted in line on said secondary spindle, means for transmitting motion from the driving pulley to one of the sleeves on the secondary spindle, means for transmitting motion from the last mentioned sleeve to the sleeve on the primary spindle, means for transmitting motion from this latter sleeve to the second sleeve on the secondary spindle, and means for transmitting motion from this latter sleeve to the primary spindle.

3. A change speed gearing comprising, in combination, a driven spindle or shaft, a primary sleeve running freely thereon, a driving pulley with extended boss, a second parallel spindle or shaft, a secondary sleeve revolubly carried thereon, gearing for transmitting the speed of the belt pulley to the secondary sleeve and gearing coöperating with said primary sleeve for transmitting the speed from said secondary sleeve to the driven spindle.

4. A change speed gearing comprising, in combination, a driven spindle or shaft, a primary sleeve running freely thereon, a driving pulley with extended boss, a second parallel spindle or shaft, a secondary sleeve revolubly carried thereon, gearing for transmitting the speed of the belt pulley to the secondary sleeve and gearing coöperating with said primary sleeve for transmitting the speed from said secondary sleeve to the driven spindle, said gearing comprising change wheels arranged on the primary and secondary sleeves in order to give a number of different speeds and levers and clutch means for rendering these change wheels operative.

5. A change speed gearing comprising, in combination, a driven spindle or shaft, a primary sleeve running freely thereon, a driving pulley with extended boss, a second parallel and fixed spindle or shaft, a secondary sleeve revolubly carried thereon, gearing for transmitting the speed of the belt pulley to the secondary sleeve and gearing coöperating with said primary sleeve for transmitting the speed from said secondary sleeve to the driven spindle.

6. A change speed gearing comprising, in combination, two parallel spindles, a sleeve on each of said spindles, a driving pulley mounted freely on one sleeve, change wheels on said sleeves and at each side of the pulley and means for rendering these change wheels operative so as to vary the speed transmitted.

In testimony whereof I affix my signature in presence of two witnesses.

HENRY SALMOND.

Witnesses:
HAROLD MYCOE,
F. MACKAY.